United States Patent [19]

Williams

[11] 4,071,603
[45] Jan. 31, 1978

[54] PROCESS FOR PREPARING PHOSPHORIC ACID

[75] Inventor: Thomas Alan Williams, Beckermet, England

[73] Assignee: Albright & Wilson Limited, West Midlands, England

[21] Appl. No.: 709,388

[22] Filed: July 28, 1976

[30] Foreign Application Priority Data

Aug. 1, 1975 United Kingdom .............. 32352/75

[51] Int. Cl.$^2$ ...................... C01B 25/16; C01F 11/46
[52] U.S. Cl. .................................... 423/320; 423/555
[58] Field of Search .................. 423/167, 320, 555

[56] References Cited

U.S. PATENT DOCUMENTS

| 3,416,887 | 12/1968 | Matsubara et al. | 423/320 |
|---|---|---|---|
| 3,418,077 | 12/1968 | Robinson | 423/320 |
| 3,453,076 | 1/1969 | Long et al. | 423/167 |
| 3,505,013 | 4/1970 | Araki et al. | 423/167 |
| 3,522,003 | 7/1970 | Lopker | 423/167 |
| 3,523,754 | 8/1970 | Yasutake et al. | 423/167 |
| 3,552,918 | 1/1971 | Fitch et al. | 423/167 |
| 3,627,485 | 12/1971 | Hori et al. | 423/167 |

FOREIGN PATENT DOCUMENTS

| 1,007,898 | 10/1905 | United Kingdom | 423/167 |
|---|---|---|---|
| 1,220,963 | 1/1971 | United Kingdom | 423/167 |
| 1,209,911 | 10/1970 | United Kingdom | 423/167 |

*Primary Examiner*—O. R. Vertiz
*Assistant Examiner*—Eugene T. Wheelock
*Attorney, Agent, or Firm*—Flynn & Frishauf

[57] ABSTRACT

In a process for preparing phosphoric acid by contact of sulphuric acid and phosphate rock with filtration of the gypsum slurry and recycle of the rest for contact with fresh rock, a fraction of the recycle slurry is treated with sulphuric acid to convert at least some of the gypsum to calcium sulphate hemihydrate and the slurry comprising hemihydrate is returned to contact the mixture of phosphate rock, phosphoric acid and recycle gypsum slurry. The process gives an easily filtered gypsum slurry with low phosphate losses in the gypsum filter cake.

17 Claims, 1 Drawing Figure

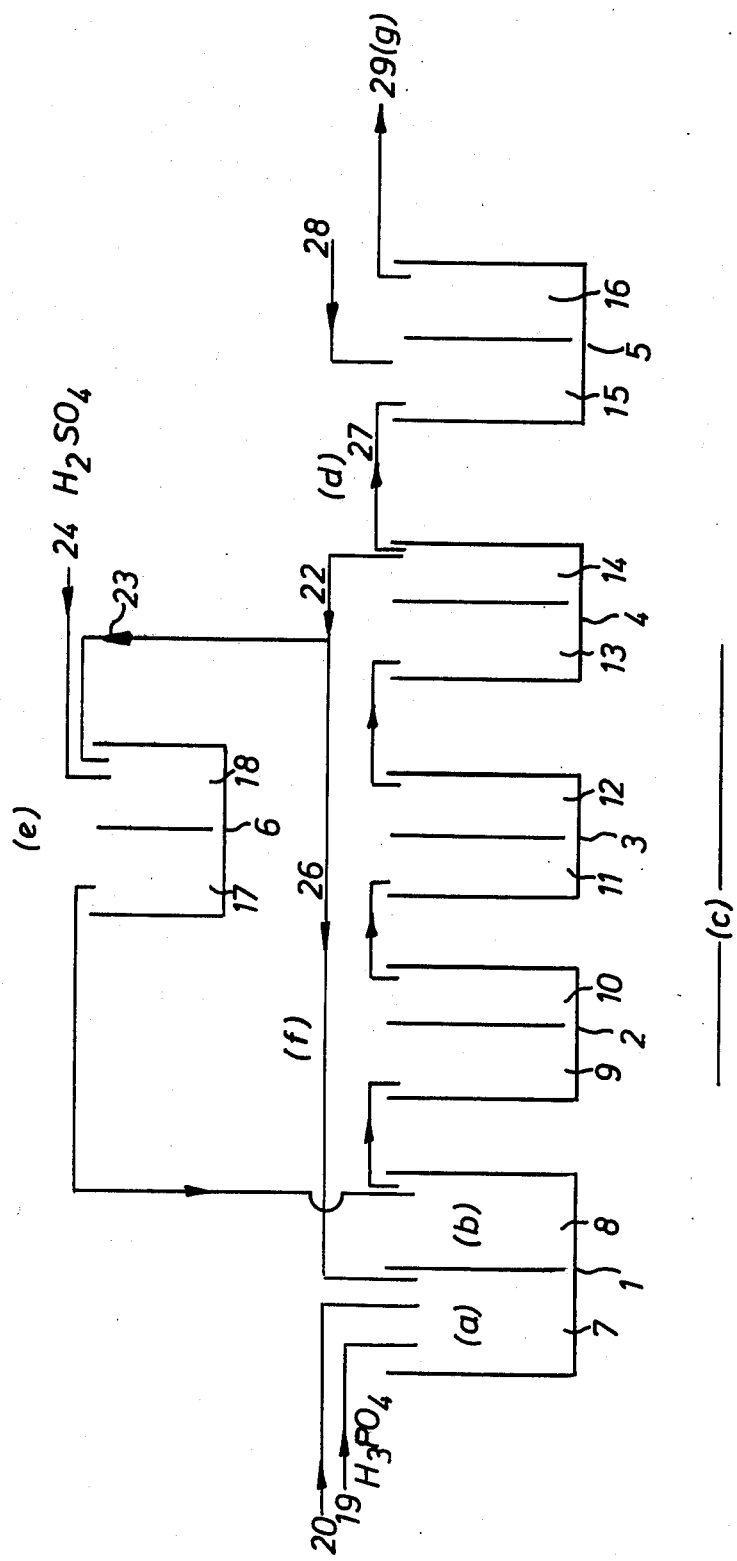

PROCESS FOR PREPARING PHOSPHORIC ACID

This invention relates to the production of phosphoric acid from calcium phosphate rock.

In a known process, crushed phosphate rock is mixed with recycle phosphoric acid and a slurry of gypsum in phosphoric acid also containing a little sulphuric acid recycled from a later stage of the process. The mixture obtained is stirred and mixed with fresh sulphuric acid, and the slurry obtained is stirred further until the rock is substantially digested. The product of the digestion stage is a slurry of gypsum and phosphoric acid containing a little sulphuric acid. A high proportion of this slurry is recycled to the first stage of the process and the remainder is passed optionally via a desulphation stage where the slurry is treated with extra phosphate rock to reduce the content of sulphuric acid in the phosphoric acid, to a filtration stage where the slurry is filtered to separate the gypsum and any undigested phosphate rock from the phosphoric acid which is the so called wet process phosphoric acid. The filter cake of gypsum is washed with dilute phosphoric acid and water to remove as much phosphoric acid as possible from the filter cake and the washings are used as the recycle acid in the digestion stage.

The step determining the rate of production of the wet process acid is the filtration step, and hence any improvements in the rate of filtration are very important. In addition it is also desirable to minimise the losses of phosphate left in the filter cake as phosphoric acid, unreacted rock and phosphate cocrystallized with gypsum. Finally, there is a problem in that sometimes while the process is operating industrially the average particle size of the gypsum crystals is reduced i.e. there is an increased proportion of small crystals, and these small crystals are less easy to filter than the larger ones. When the amount of small crystals increases, the filtration rate is reduced and hence the rate of production of wet process acid is reduced. Previously, surfactants have been added to the digestion stage of the acid production in an attempt to produce different more easily filterable crystals. The reasons for the appearance and disappearance of the small crystals are not fully understood.

We have found a process for making phosphoric acid in which the filtration rate and hence the production rate may be increased and the percentage loss of phosphate associated with the filter cake may be reduced with a much reduced tendency for the process to give the small crystals.

The present invention provides a process for producing wet process phosphoric acid, which comprises the steps of (a) contacting phosphate rock with aqueous phosphoric acid and a slurry comprising gypsum, phosphoric acid and sulphuric acid recycled from step (f) of the process, to produce a first reaction mixture, (b) contacting said first reaction mixture with a product slurry obtained from step (e) of the process to give a second reaction mixture, (c) allowing the acids in said second mixture to digest the rock to substantial completion to give a slurry comprising gypsum, phosphoric acid and sulphuric acid, (d) withdrawing a first fraction of said slurry as product and a second fraction for use in step (e) and leaving the remainder of said slurry, the weight ratio of the first fraction to the second fraction being in the range 1 : 0.75 to 1 : 3, (e) mixing said second fraction of slurry with sulphuric acid so that the conditions of acid concentration, temperature and time are such as to cause the gypsum in said slurry to be converted at least partly into calcium sulphate hemihydrate crystals in the slurry, and recycling said slurry containing hemihydrate to step (b) of the process, (f) recycling said remainder of the slurry from step (d) to step (a), and (g) filtering the product first fraction of slurry of step (d) to yield an aqueous solution of phosphoric acid as filtrate, the total amount of sulphuric acid present in step (c) being sufficient to digest the rock and at least some of said sulphuric acid being added in step (e), the rest (if any) being added in step (a), (b) or (c).

The main difference from the previous processes lie in the treatment of the second fraction of the recycled slurry in step (e) instead of recycling all of it, the addition of the sulphuric acid to this second fraction of slurry in step (e) instead of, or less preferably, as well as, to the mixture of phosphate rock, phosphoric acid and slurry obtained in the first stage and also the intermediate production of hemihydrate.

The variables in step (e) for converting gypsum to hemihydrate are interrelated and are the temperature, the total acidity of the slurry, its phosphoric and sulphuric acid contents, the overall reaction time, the number of tanks in which the conversion takes place and the desired degree of conversion of gypsum into hemihydrate. The reaction temperature is usually 70° – 80° C, preferably 72° – 78° C, especially 75° – 78° C. The total acidity of the slurry expressed as the sum of its phosphoric acid content (expressed as % $P_2O_5$) and its sulphuric acid content (expressed as % $SO_3$) is usually 35 – 43%, the range 37 – 43% being more suitable when the concentration of sulphuric acid added to the slurry in step (e) is 75 – 80% e.g. about 77% (% $H_2SO_4$) and the range 35 – 42% being more suitable when the concentration of sulphuric acid added to the slurry is 90 – 95%, e.g. about 93% (expressed as % $H_2SO_4$). The phosphoric acid concentration (expressed as % $P_2O_5$) is usually 17 – 26% being normally 17 – 23% when the added sulphuric acid concentration is 75 – 80% about e.g. 77% and 22 – 26% when the added sulphuric acid concentration is 90 – 95%, e.g. about 93%. The sulphuric acid concentration (expressed as % $SO_3$) in the slurry in step (e) is usually 9 – 26%, being normally 14 – 26%, e.g. 16 – 26% when the added sulphuric acid concentration is 75 – 80%, e.g. about 77% (expressed as $H_2SO_4$), and 9 – 20% when the added sulphuric acid concentration is 90 – 95% e.g. about 93% (expressed as $H_2SO_4$). The overall residence time, that is the volume of the reactor or reactors used in step (e) divided by the overall rate of flow of liquid through the reactor(s), is usually in the range 5 minutes to 5 hrs such as 20 minutes to 5 hours or 5 minutes to 1 hr, especially 5 minutes — 30 minutes and the number of reactors is usually 1 – 6, preferably 1 – 4, and especially 2. Especially preferred are residence times of 18 – 25 minutes with one reactor or 10 – 17 minutes with two reactors. Each reactor may be an individual body separate from the rest or just a compartment of a bigger body. The degree of conversion from gypsum to hemihydrate is usually at least 5% (expressed as the percentage of the weight of hemihydrate made to the weight of gypsum in the product slurry filtered in step (g)), and less than 60%, e.g. less than 50%, usually 5 – 60%, e.g. 5 – 50% and especially 20 – 50% such as about 35%. The degree of conversion can be estimated visually by microscopic examination of a sample of the slurry being recycled to step (b); the crystals of gypsum and hemihydrate look different. Alternatively a sample of the slurry can be taken, filtered, the filter cake washed with acetone, dried and the weight loss on calcination determined.

To show the interrelation between the variables, the effect of an increase in each on the others will be described. An increase in the temperature, total acidity, phosphoric acid content or sulphuric acid content increases the degree of conversion or decreases the residence time for the same conversion or reduces the number of reactors for the same residence time and conversion. An increase in the overall residence time increases the conversion or decreases the number of reactors for the same conversion. An increase in the number of reactors increases the efficiency of mixing and increases the conversion for constant residence time or decreases the residence time for the same conversion, e.g. the same conversion may be achieved under otherwise identical conditions with 2 reactors and a total of about 15 minute residence time or one reactor and about 20 minutes residence time. The acidity of the slurry in step (e) depends on the phosphoric acid and sulphuric acid concentrations, but the former is fixed in any system by the concentration of acid being withdrawn as filtrate. In the preferred process, all the sulphuric acid entering the system enters in step (e), and the total amount of sulphuric acid needed depends on the amount of phosphate rock to be digested, a slight excess of the sulphuric acid being used. Thus the total amount of sulphuric acid entering in step (e) is effectively fixed by the through put of phosphate rock. The concentration of the fresh sulphuric acid being added which is usually in the range 70 – 95% is such that the total acid concentration in the slurry is sufficiently high to allow conversion of the gypsum to hemihydrate, the particular amounts being as described above. Thus under otherwise constant conditions, the concentration of the added sulphuric acid is higher when the weight ratio of slurry treated to form hemihydrate to product slurry is higher than when it is lower. The weight ratio of the first fraction of slurry for eventual filtering to give phosphoric acid to the second fraction of slurry to be treated to form hemihydrate is 1 : 0.75 to 1 : 3. When the concentration of sulphuric acid added in step (e) is about 77%, the ratio is 1 : 0.75 to 1 : 1.5, preferably 1 : 0.85 to 1 : 1.2, especially 1 : 1, and when the concentration of sulphuric acid added in step (e) is higher, about 93%, the ratio is 1 : 1.5 to 1 : 3, preferably 1 : 1.7 to 1 : 2.3, especially 1 : 2. The higher the amount of slurry contacted with the fresh sulphuric acid under otherwise identical conditions in step (e), the longer the time for the same total conversion of gypsum to hemihydrate. The smaller the amount of slurry contacted with the sulphuric acid under otherwise identical conditions, the smaller the amount of small crystals of gypsum converted to hemihydrate and hence the smaller the effect on the filtration rate and phosphate retention in the filter cake. Instead of adding all the sulphuric acid in step (e), a proportion as low as 50% of the acid may be added in step (e), the rest being added to the slurry & rock before, with or after the addition of the hemihydrate slurry in step (b). However the conditions in step (e) must still be sufficient to convert at least some of the gypsum to hemihydrate. Preferably at least 80% of the acid is added in step (e), and especially substantially all the acid.

The phosphate rock used in the process of the invention is not restricted as to its source or impurity content or pretreatment so that Moroccan, Florida and calcined rock can all be digested. However, as a high metal impurity content such as is found in the Florida rocks promotes the production of large gypsum crystals, the process is particularly applicable for processes involving the purer rocks such as Moroccan rock. Thus preferably the phosphate rock is one in which the weight ratio of iron (as $Fe_2O_3$) to recoverable phosphate values (expressed as $P_2O_5$) is less than 0.02 : 1, e.g. 0.001 : 1 to 0.015 : 1, preferably 0.001 : 1 to 0.010 : 1 especially 0.003 : 1 to 0.009 : 1 such as about 0.006 : 1; preferably the rock also has a weight ratio of aluminium (as $Al_2O_3$) to recoverable phosphate values (as $P_2O_5$) of less than 0.025 : 1, e.g. 0.001 : 1 to 0.02 : 1, such as 0.006 : 1 to 0.015 : 1. The acids produced from such purer rocks have iron contents (expressed by weight as $Fe_2O_3$ of an aqueous acid of 56.5% $P_2O_5$ content) of less than 0.7%, e.g. 0.1 – 0.4% and especially 0.1 – 0.3%, and preferably less than 0.7% aluminium (as $Al_2O_3$), e.g. less than 0.6% and especially less than 0.4% e.g. 0.05 – 0.4%. Examples of the purer rocks which are of particular use in this process are Moroccan, Kola, Tunisian and Nauru rock.

The phosphate rock is mixed in step (a) with recycle phosphoric acid and recycle slurry containing gypsum, phosphoric and a little sulphuric acid. The recycle phosphoric acid has an acidity of 15 – 25%, usually about 22% $P_2O_5$ and is advantageously product phosphoric acid obtained from washing the gypsum filter cake.

The mixture obtained in step (a) optionally after ageing by being passed through a reactor is mixed further in step (b) with the slurry of hemihydrate, phosphoric and sulphuric acid, which also contains gypsum, obtained in step (e) of the process. The conditions of acid concentration and temperature in mixing steps (b) and digestion step (c) are such that the gypsum is formed from the acid and phosphate rock and the hemihydrate is converted to gypsum. The mixture obtained in step (b) is digested until substantially no further phosphate rock will react with the sulphuric acid. This digestion stage is usually carried out at a temperature of 60° – 80° C e.g. 70 – 80 and especially 70° – 75° C and preferably in a series of stirred reactors, the overflow from one reactor passing to the next. Each reactor may be divided into two or more stirred compartments the overflow from one passing into the second and thence to the next compartment. Preferably there are three reactors each with two compartments, in addition to the first stirred reactor divided into two stirred compartments, in the first of which step (a) of the process is carried out and in the second of which step (b) is performed. The digestion time is often 6 – 12 hours and often about 8 hours. The sulphuric acid content of the liquid is reduced as the digestion proceeds to a value usually of 20 – 40g (expressed as $SO_3$) per litre of liquid, and preferably 20 – 35g.

At the end of the digestion, the slurry contains gypsum, phosphoric acid and some sulphuric acid, the total acidity (expressed as % $SO_3$ + % $P_2O_5$) usually being 27 – 35%. The slurry is divided in step (d) of the process with withdrawal of some of the slurry as a first fraction for eventual filtration, and withdrawal of a second fraction for conversion of the gypsum into hemihydrate and recycle, the weight ratio of the first product fraction to the total of second fraction and recycled remainder usually being in the range 1 : 6 to 1 : 60, preferably 1 : 6 to 1 : 16 and especially 1 : 6 to 1 : 10 e.g. about 1 : 8.

The first fraction of the original slurry withdrawn from the end of the digestion stage may be filtered directly but is preferably treated first in a desulphation stage with further phosphate rock to reduce its sulphuric acid content e.g. to a level of less than 12g e.g. about 6g SO₃ per litre of liquid.

The product slurry as such or after the desulphation treatment is filtered in step (g) to yield a filter cake comprising gypsum and unreacted phosphate rock and entrained phosphate values and a filtrate of wet process phosphoric acid. The filtration can be carried out in one or more stages. The filter cake is washed with dilute phosphoric acid to reduce the entrained phosphate content in the cake, the dilute acid being obtained from washing of previous filter cakes with more dilute acid still or ultimately with water. When the phosphoric acid concentration in the washings is high enough e.g. to about 22% (as P₂O₅), the washings are recycled to step (a) of the process.

It is believed that any small crystals of gypsum which may have formed in the digestion are preferentially redissolved in step (e) of the process and reprecipitated as hemihydrate crystals. The slurry containing the hemihydrate is passed to steps (b) and (c) of the process where the conditions are such that the hemihydrate is reconverted into gypsum. The overall effect of the step (e) in the entire process is thus to remove a proportion of the small crystals of gypsum, from the digested slurry, which makes the total slurry difficult to filter and replace them by normal size gypsum crystals. Thus in a continuous process, the percentage of small crystals of gypsum in the digested slurry and hence in the slurry to be filtered can be kept low and hence the filtration rate and rate of production of phosphoric acid can be increased and entrained phosphoric acid in the filter cake reduced.

While usually plant in which the process of the invention is carried out is constructed specifically for the purpose of this process, it is possible to modify existing wet process phosphoric acid plants using the known process described initially in this Specification. Thus instead of the mixing of the fresh sulphuric acid early in the digestion stage with phosphate rock, recycle phosphoric acid and recycle gypsum slurry, a portion of the gypsum slurry recycled from the digestion stage can be treated with the fresh sulphuric acid under the conditions of step (e) of this process and the product obtained containing hemihydrate and the fresh sulphuric acid can then be mixed with the slurry of phosphate rock, gypsum and phosphoric acid early in the digestion stage. Thus if for any reason it is not desired to operate the process of the invention continuously, it can be kept in reserve and operated only when the filtration rate is reduced because of the production of the small crystals of gypsum. However, because the small crystals are produced unpredictably for no apparent reason, it is preferable to operate the process of the invention continuously and not on demand when the filtration rate is reduced.

The invention is illustrated with reference to the accompanying drawing which is a schematic flow diagram of a preferred form of plant utilizing the process of the invention, in which the letters (a) - (g) show the areas of the plant corresponding to steps (a) - (g) respectively of the process of the invention.

The plant comprises a series of reactors 1, 2, 3, 4, 5 and 6, each divided into 2 compartments 7, 8 and 9, 10 and 11, 12 and 13, 14 and 15, 16 and 17, 18 respectively. The contents of each compartment are mixed by a stirrer or other mixing means (not shown). Into compartment 7 pass input lines 19, 20 and 26, while into compartment 8 passes input line 25. Compartments 8 and 9, 10 and 11, and 12 and 13 respectively are joined by overflow lines. Compartments 14 and 18 are joined by way of line 22 and its branch line 23, while its other branch line 26 joins line 22 (and thus compartment 14) with compartment 7. Apart from line 23 compartment 18 also has an input line 24. Line 25 joins compartment 17 and compartment 8. Into compartment 15 passes line 28 and also line 27 from compartment 14. Line 29 is joined to compartment 16. Line 25 may pass into compartment 9 as well as or instead of compartment 8 (not shown).

In use, into compartment 7 is fed recycle phosphoric acid through line 19, crushed phosphate rock through line 20 and recycle gypsum slurry containing gypsum, phosphoric acid and a little sulphuric acid through line 26. The mixture produced is stirred and is passed into compartment 8 where it meets a slurry of hemihydrate, gypsum and phosphoric and sulphuric acids, entering through line 25. The slurry produced in compartment 8 is then passed progressively through compartments 9 - 14 whereupon the digestion of the phosphate rock is substantially complete. From compartment 14, a first fraction of the slurry is withdrawn through line 27 and the remainder is passed for recycling is passed into line 22. The recycle slurry passing down line 22 is divided, some proceeding through line 26 to compartment 7, while the remainder is passed through line 23 into compartment 18 where it mixes with fresh sulphuric acid entering through line 24. The conditions in compartments 18 and 17 are such that calcium sulphate hemihydrate is formed. The product slurry from compartment 17 which comprises hemihydrate, gypsum, sulphuric and phosphoric acids is passed through line 25 into compartment 8. (and/or compartment 9 as mentioned above, but not shown).

The first fraction of the gypsum slurry withdrawn from compartment 14 through line 27 is mixed in compartment 15 with further powdered phosphate rock entering through line 28 to reduce the sulphuric acid content of the slurry. The mixture from compartment 15 is passed to compartment 16 to complete the desulphation and thence out through line 29 to be filtered (not shown) to give a filter cake and filtrate wet process phosphoric acid. The filter cake is washed with dilute phosphoric acid, and then with water.

The invention is further illustrated in the following Examples in which a process as described above with reference to the accompanying drawing is used, except that in Example 1 reactor (6) was not subdivided into two compartments, and there is no desulphation stage so reactor 5 and line 28 are absent. Example 1 he process conditions for converting phosphate rock into phosphoric acid were as follows: Recycle phosphoric acid concentration 22% P₂O₅ entering through line 19. Moroccan calcium phosphate rock containing 0.21% iron (as Fe₂O₃), 33.4% of recoverable phosphate (as P₂O₅) and 0.41% aluminium (as Al₂O₃) feed rate 12.4 g/min entering through line 20. Temperature of digestion stages in compartments 7 - 14, 70° - 72° C. SO₃ content of slurry in compartment 10 35g/l. Residence time for digestion 8 hours. Recycle ratio of first fraction of slurry withdrawn for filtration to remainder 1 : 8. Proportion of second fraction of recycle slurry fed through line 23 into reactor 6 to first fraction of slurry for filtration 1 : 1. Sulphuric acid fed into reactor 6 through line 24 at a rate of 10 mls/min of 77% acid (expressed as H₂SO₄). Temperature of slurry in reactor 6 76° - 78° C. Total acidity in reactor 6 41.5% being the sum of a 19.0% sulphuric acid concentration (expressed as $SO_3$) and a 22.5% phosphoric acid concentration (expressed as $P_2O_5$). Residence time in reactor 6 about 15 minutes. Concentration of $SO_3$ in slurry from line 27 and ready for filtration 32g/l. The slurry from line 27 was filtered, the filter cake being washed with dilute phosphoric acid and water. On a plant scale, a rotating Prayon filter would be used with a 5-8 cm thick filter cake, the rate of rotation of the filter being adjusted so that in a single cycle the slurry was filtered, washed, pulled dry and the cake removed ready for the next filtration, the time for the complete cycle being noted. This filtration system was simulated on the laboratory scale of the present Example with a 0.1 sq. ft. (0.093 sq. m) filter, through which (a) a 1 l. sample of the slurry at 60° – 65° C was filtered under 38 cm Hg pressure to surface dryness, the vacuum released, (b) aqueous phosphoric acid (800 ml) (the filtrate from a previous operation (c)) of specific gravity 1.03 – 1.06 at 50° – 55° C was added to the filter cake on the filter and the mass filtered under the vacuum, (c) the vacuum released and aqueous phosphoric acid (800 ml) the filtrate from a previous operation (d) of specific gravity 1.01 – 1.02 at 50° C was added to the filter cake and the mass filtered as before, (d) the vacuum was released and water (600 ml) at 50° – 55° C was added to the cake and the mass filtered. The total filtration time is the sum of the time for filtration under the vacuum to surface dryness in steps (a), (b), (c) and dryness in step (d). In each filtration the volume, temperature of specific gravity of the filtrate was determined. The filter cake at the end of step (d) was measured for thickness and analysed for unreacted rock, phosphate cocrystallized in the gypsum and soluble phosphate. The correct cycle time for strict analogy with a large scale rotating Prayon filter with 7.6 cm filter cake is then the total cycle time found above multiplied by a factor of 7.6 divided by the observed cake thickness in cm. The rate of production of phosphoric acid is proportional to the inverse of the square root of the simulated cycle time.

The process of Example 1 above was compared with the known process (Comparative Example 1), and (Comparative Example 2) a modification of the latter process, all three processes having recycle ratios of 1 : 8. The process of Comparative Example 1 was the same as that of Example 1 apart from the absence of the passage of some of the recycled slurry into reactor 6 for contact with sulphuric acid; instead all the recycled slurry was returned to compartment 7 and all the sulphuric acid was added in compartment 8. The process of Comparative Example 2 was similar to that of Comparative Example 1 but all the sulphuric acid was added to the recycle slurry before contact with the phosphate rock (rather than afterwards as in Comparative Example 1). In Comparative Example 2, the conditions under which the sulphuric acid contacts the slurry were not those allowing formation of hemihydrate.

In each case the recycle time, the average $SO_3$ content in compartment 10, the density of filtrate acid from step (a) and the $P_2O_5$ content of the gypsum, the total filter cake solids and the soluble part of the filter cake were determined. The results were as follows:

| Process | Filtration Cycle Time (sec.) | Average $SO_3$ content g/l in compartment 10 | Density of Phosphoric Acid Filtrate | % $P_2O_5$ loss In Solids | | | Soluble part of filter cake | Total $P_2O_5$ loss |
| --- | --- | --- | --- | --- | --- | --- | --- | --- |
| | | | | Cocrystallized In gypsum | Unattacked Rock | Total | | |
| Example 1 | 120 | 35 | 1.30 | 1.20 | 0.77 | 1.97 | 0.23 | 2.20 |
| Comparative Example A | 140 | 29 | 1.32 | 1.78 | 0.86 | 2.64 | 0.3 | 2.94 |
| Comparative Example B | 170 | 34 | 1.305 | 1.25 | 0.96 | 2.21 | 0.26 | 2.47 |

These results show that the process A of the present invention gives a decreased cycle time (and hence increased production rate) and decreased phosphate losses over the known gypsum process B and the modified process C.

EXAMPLE 2

The process of Example 1 was repeated on a larger scale but with the following differences; reactor 6 was divided into 2 compartments and reactor 5, and lines 28 and 29 were present (as in the accompanying drawing); the first compartment 18 of reactor 6 being of 10 minute residence time and the second compartment 17 being of 5 minute residence time, Moroccan phosphate rock of the same analysis as in Example 1 but at a feed rate of 24 tonne/hr, temperature of digestion stages in compartments 7 – 14 70° – 75° C, rate of feeding 77% sulphuric acid into reactor 6 26.2 tonne/hr, temperature of slurry in reactor 6 77° C, total residence time in reactor 6 15 minutes, degree of conversion to hemihydrate in reactor 6 by weight loss about 35%, hemihydrate slurry fed through line 25 into compartment 9 and the product slurry after desulphation was filtered on a rotating Prayon filter. The total $P_2O_5$ lost in the gypsum, unattached rock and soluble part of the filter cake was 4.1%, in comparison with about 5.0% for a comparable large scale process under otherwise similar conditions but without the conversion to hemihydrate (analoguous to Comparative Example 1).

I claim:

1. A process for producing wet process phosphoric acid, which comprises the steps of (a) contacting phosphate rock with aqueous phosphoric acid and a slurry comprising gypsum, phosphoric acid and sulphuric acid recycled from step (f) of the process, to produce a first reaction mixture, (b) contacting said first reaction mixture with a hemihydrate containing slurry obtained from step (e) of the process to give a second reaction mixture, (c) allowing the acids in said second mixture to digest the rock to substantial completion to produce a slurry comprising gypsum, phosphoric acid and sulphuric acid, (d) withdrawing a first fraction of said slurry as product which is processed as set forth in step (g) and a second fraction which is processed as set forth in step (e) and a third fraction comprising the remainder of said slurry, the weight ratio of the first fraction to the second fraction being in the range 1 : 0.75 to 1 : 3, (e) adding sulphuric acid to said second fraction of slurry and mixing under conditions of acid concentration, temperature and time such as to convert at least a part of the gypsum in said slurry into calcium sulphate hemihydrate crystals in the slurry, and recycling said slurry containing hemihydrate to step (b) of the process, (f)

recycling said third fraction of the slurry from step (d) to step (a), and (g) filtering the product first fraction of slurry of step (d) to yield an aqueous solution of phosphoric acid as filtrate, the total amount of sulphuric acid present in step (c) being sufficient to digest the rock.

2. A process according to claim 1 wherein 5 – 50% of the gypsum in said second fraction is converted to hemihydrate in step (e).

3. A process according to claim 1 wherein all the sulphuric acid needed to react with substantially all the phosphate rock and convert gypsum into hemihydrate is added in step (e).

4. A process according to claim 1 wherein the temperature during the digestion in step (c) is 60° – 80° C and the temperature of the conversion to hemihydrate is 70° – 80° C.

5. A process according to claim 4 wherein the digestion temperature is 70° – 75° C and the hemihydrate conversion temperature is 75° – 78° C.

6. A process according to claim 1 wherein in step (e) the total acidity, which is the total concentration of phosphoric acid (expressed as $P_2O_5$) and sulphuric acid (expressed as $SO_3$), is 35 – 43% and the concentration of phosphoric acid (expressed as $P_2O_5$) is 17 – 26%.

7. A process according to claim 1 wherein the concentration of sulphuric acid (expressed as % $H_2SO_4$) added in step (e) is 70 – 95%.

8. A process according to claim 6 wherein in step (e), sulphuric acid of concentration 75 – 80% in an amount sufficient to react with substantially all the phosphate rock is added to the second fraction slurry to give an overall acidity of 37 – 43% (expressed as the sum of the % $P_2O_5$ and %$SO_3$ contents of the slurry) in said slurry, with a sulphuric acid concentration (expressed as $SO_3$) of 14 – 26% and a phosphoric acid concentration (expressed as $P_2O_5$) of 17 – 23%.

9. A process according to claim 8 wherein the weight ratio of said first fraction of slurry withdrawn in step (d) to said second fraction of slurry reacted in step (e) is 1 : 0.75 to 1 : 1.5.

10. A process according to claim 9 wherein said weight ratio is about 1 : 1.

11. A process according to claim 1 wherein the weight ratio of the first fraction of slurry withdrawn as product in step (d) to the total weight of the second fraction of slurry for conversion in step (e) and the recycled third fraction of the slurry is 1 : 6 to 1 : 16.

12. A process according to claim 11 wherein said ratio is 1 : 6 to 1 : 10.

13. A process according to claim 1 wherein said phosphate rock has a weight ratio of iron (as $Fe_2O_3$) to recoverable phosphate values (expressed as $P_2O_5$) of less than 0.02 : 1.

14. A process according to claim 1 wherein the process of the conversion step (e) is carried out in one reactor with a residence time of 18 – 25 minutes.

15. A process according to claim 8 wherein 5 – 50% of the gypsum in said second fraction is converted to hemihydrate in step (e), wherein all the sulphuric acid needed to react with substantially all the phosphate rock and convert gypsum into hemihydrate is added in step (e), wherein the digestion temperature is 70° – 75° C and the hemihydrate conversion temperature is 75° – 78° C, wherein the weight ratio of the first fraction of slurry withdrawn as product in step (d) to the total weight of the second fraction of slurry for conversion in step (e) and the recycled third fraction of the slurry is 1 : 6 to 1 : 10.

16. A process according to claim 15 wherein said phosphate rock has a weight ratio of iron (as $Fe_2O_3$) to recoverable phosphate values (expressed as $P_2O_5$) of less than 0.02 : 1.

17. A process according to claim 1 wherein the process of the conversion step (e) is carried out in two reactors with a total residence time of 10 – 17 minutes.

* * * * *